United States Patent
Kropas-Hughes et al.

(10) Patent No.: US 6,401,082 B1
(45) Date of Patent: Jun. 4, 2002

(54) AUTOASSOCIATIVE-HETEROASSOCIATIVE NEURAL NETWORK

(75) Inventors: Claudia V. Kropas-Hughes, West Carrollton; Steven K. Rogers, Beavercreek; Mark E. Oxley; Matthew Kabrisky, both of Dayton, all of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/434,549

(22) Filed: Nov. 8, 1999

(51) Int. Cl.⁷ .................................................. G06N 3/00
(52) U.S. Cl. ........................ 706/26; 706/25; 216/60
(58) Field of Search ...................... 706/26, 25; 216/60

(56) References Cited

U.S. PATENT DOCUMENTS

| | | | |
|---|---|---|---|
| 5,377,305 A | 12/1994 | Russo | 395/11 |
| 5,467,428 A * | 11/1995 | Ulug | 706/25 |
| 5,467,883 A * | 11/1995 | Frye et al. | 216/60 |
| 5,493,631 A | 2/1996 | Huang et al. | 395/22 |
| 5,561,741 A * | 10/1996 | Wasserman | 706/25 |
| 5,588,091 A | 12/1996 | Alkon et al. | 395/24 |
| 5,822,742 A | 10/1998 | Alkon et al. | 706/31 |

OTHER PUBLICATIONS

Mehrota, Kishan, et al., Elements of Artificial Neural Networks, The MIT Press, 1997, pp. 27–29.*

* cited by examiner

*Primary Examiner*—Wilbert L. Starks, Jr.
(74) *Attorney, Agent, or Firm*—Gina S. Tollefson; Gerald B. Hollins; Thomas L. Kundert

(57) ABSTRACT

An efficient neural network computing technique capable of synthesizing two sets of output signal data from a single input signal data set. The method and device of the invention involves a unique integration of autoassociative and heteroassociative neural network mappings, the autoassociative neural network mapping enabling a quality metric for assessing the generalization or prediction accuracy of the heteroassociative neural network mapping.

20 Claims, 5 Drawing Sheets

AUTOASSOCIATIVE-HETEROASSOCIATIVE NEURAL NETWORK

RIGHTS OF THE GOVERNMENT

The invention described herein may be manufactured and used by or for the Government of the United States for all governmental purposes without the payment of any royalty.

BACKGROUND OF THE INVENTION

The field of the invention is neural networks and more particularly multi-layer artificial neural networks.

Generally, a neural network consists of interconnected units, called nodes, with weighting factors applied to each interconnection. Each node receives a series of inputs, an input being a single sample of data from a larger data sample, and each input to a node is weighted. The weighted inputs are summed, a bias term is added and a transformation, called an activation function, is applied to the weighted sum in order to obtain a representative value of a minimized dimension. The activation function applied will typically be a squashing function, such as a sigmoid or the hyperbolic tangent, or can be a linear function. Intermediate layers of nodes are implemented to allow non-linear representations/mappings of the data. Often, the weights are determined by an optimization procedure called backpropagation, which is applied during the training of the artificial neural network. Training the artificial neural network causes the network to "learn" how to manipulate the data and is needed in order that a selected set of data may be similarly manipulated to produce an output. Backpropagation is a systematic method for training multi-layer artificial neural networks. The backpropagation algorithm, a deterministic training method, employs a type of gradient descent; that is, it follows the slope of the error surface downward, constantly adjusting the weights toward a minimum error. The error surface can be a highly convoluted surface, with many hills and valleys, and a sequence of weights can get trapped in a local minimum, a shallow valley, when there is a much deeper minimum nearby.

The most common error function used in artificial neural networks is the global measure of network energy called mean squared error. Mean square error is defined as the mean square between the actual network outputs and the desired outputs for the network, and can be defined as a function of a set of network parameters. The network parameters, or variables, are the network weights.

Neural networks, as compared to more conventional methods of function approximation, exploit to advantage an adaptive set of basis to approximate a mapping between variables. This mapping can be autoassociative, a variable mapping to itself, or it can be predictive or heteroassociative, a variable mapped to a different variable. Autoassociative neural networks, a variable mapping to itself, are in general an intermediate step within a larger data communication system.

Neural networks are limited by the "robustness" of the data set over which the mappings are accomplished. The robustness can be best described in a statistical context, wherein a sampling statistic is robust if the sampling distribution is representative of the population distribution. In the case of neural networks and other function approximation methods, the prediction of an output based on a new input is termed "robustness" or "generalization." Robustness or generalization is based upon the number of points which are close to, and which hopefully encompass, the point to be predicted based upon the mapping. If there are points which are close and which encompass the point to be predicted, then robustness is regarded, in a qualitative sense, to be high.

Autoassociative neural networks (AANNs) are feedforward artificial neural networks generated from multi-layer perceptrons. An AANN is trained with the input and target data identical. In other words, an AANN maps the training data back to itself, through a specific network architecture. If the number of nodes in the AANN is smaller than the number of features in each of the training data samples, then the AANN accomplishes data reduction. A typical prior art AANN software architecture is shown in FIG. 1. In FIG. 1, a three hidden layer architecture is used for data compression, an input hidden layer at 100 and an output hidden layer at 101. The compression of layers is represented at 102. The FIG. 1 arrangement shows a three hidden layer architecture but any number of hidden layers may be used.

AANNs have been extended from processing one data set to processing two data sets, simultaneously. These are referred to as heteroassociative neural networks (HANNs) and map one set of data on the input, to a target data set that is different than the input. The HANN can effectively generate a second data set from the first set of data. However, the relationship between the two data sets is not observable and the robustness of the network is not quantifiable. The network incorporates all the interrelationships and the correlation of the features within the network and is not directly interpretable because the target data is different than the input data and there is no way to determine the accuracy of the target data. FIG. 2 is a typical prior art HANN software architecture, and is the same architecture as the AANN in FIG. 1. The HANN, as shown in FIG. 2 varies from the AANN only in that the output is different than the input. FIG. 2 shows the input at 200 with compressed hidden layers at 201 and the output at 202.

Another type of HANN is a network with both data sets as input and output. This type of HANN, a joint data HANN, provides for a mutual mapping of the two data sets. This mutual mapping provides the interrelationships that exist between the two different data sets. The joint data HANN is a mutual mapping function and therefore cannot provide a precise prediction capability. Both of the data sets must be input, to generate an accurate prediction on one or the other. FIG. 3 shows a prior art software architecture for this type of HANN. Any number of hidden layers can be applied, based on the problem application.

Conventional neural network methods currently used do not provide an ability to synthesize data from a data set in a comprehensive and verifiable manner. That is, synthesize in a manner in which robustness of the network is verifiable. The present invention solves problems in the art of autoassociative networks that only map training data back to itself and in heteroassociative networks that are unable to quantify a network's robustness and can effectively generate a data set from first set of data, but where the two data sets are not observable.

The present invention may be used as a neurocomputing tool in, for example, process discovery as applied to thin film growth and new materials design. This invention provides a means to simulate a data set, given another data set. The predictor portion of this neural network provides an ability to simulate new material processes; this simulation provides the means to map the materials processes into a design space. In this design space, feedback and refinement to the process is possible, as is the creation of a 'self-improving' design environment. The accuracy of this neural network is deterministic due to the incorporation of the autoassociative portion; it is this autoassociative portion that provides a statistical means to validate the performance of the Autoassociative-Heteroassociative Neural Network of the invention.

SUMMARY OF THE INVENTION

The present invention provides an efficient neurocomputing technique to analyze and predict or synthesize one data set from another, with a method to assess the generalization or robustness of the neural network operation. The method and device of the invention involves integration of autoassociative and heteroassociative neural network mappings, the autoassociative neural network mapping enabling a quality metric for assessing the generalization or prediction accuracy of a heteroassociative neural network mapping.

It is therefore an object of the invention to provide a method for efficient neurocomputing to analyze and predict one data set from another with quantifiable accuracy.

It is another object of the invention to provide a method for assessing general robustness for nonlinear mappings in neural networks.

It is another object of the invention to provide an integration of autoassociative and heteroassociative neural network mappings.

These and other objects of the invention are described in the description, claims and accompanying drawings and are achieved by a robustness quantifiable neural network capable of synthesizing two sets of output signal data from a single input signal data set, said network comprising:

an encoding subnetwork comprising:
  a plurality of input signal receiving layers and nodes communicating said input signals to a projection space of said neural network, said input signals being from a source external to said neural network, a plurality of encoding nodes within said neural network input signal receiving layers forming one representative input signal;
a decoding subnetwork connected to said projection space comprising:
  a plurality of output signal transmitting layers communicating output signal data from said projection space of said neural network to an output;
  a plurality of decoding nodes within said output signal transmitting layers jointly transforming said input signal data set to a first predicted data set and a second data set replicating said input signal data set;
a mean square error backpropagation neural network training algorithm;
a source of training data connected to said encoding subnetwork and applied to said mean square error backpropagation neural network training algorithm as a single set on said encoding subnetwork and generating two data sets from said decoding network; and
an input signal data set and said second data set from said decoding subnetwork comparator block, said comparator block comparing accuracy of replication of said second data set from said decoding subnetwork to said input signal data set indicating robustness of said neural network.

DETAILED DESCRIPTION OF THE INVENTION

The invention describes a new type of data processing neural network: the Autoassociative - Heteroassociative Neural Network (A-HNN). The A-HNN of the invention provides the ability to predict one data set from another data set and at the same time validate the accuracy of the predicted data set. The A-HNN is a specific implementation of a multi-layer artificial neural network and is implemented as a multilayer perceptron neural network. A significant aspect of the invention is accomplished by inputting to the neural network a single data set and outputting two data sets. The first data set output operates with the input data set autoassociatively and the second data set output operates with the input data set heteroassociatively or in other words is a synthesis or prediction. The inclusion of the autoassociative output provides an ability to validate the accuracy of the second, predicted, data set output.

An exemplary application for the neural network of the invention would be in predicting stock market fluctuations. Predicting stock market fluctuations is a popular application of neural networks and with the present invention, the prediction could be made with an associated degree of risk.

Figure 1:
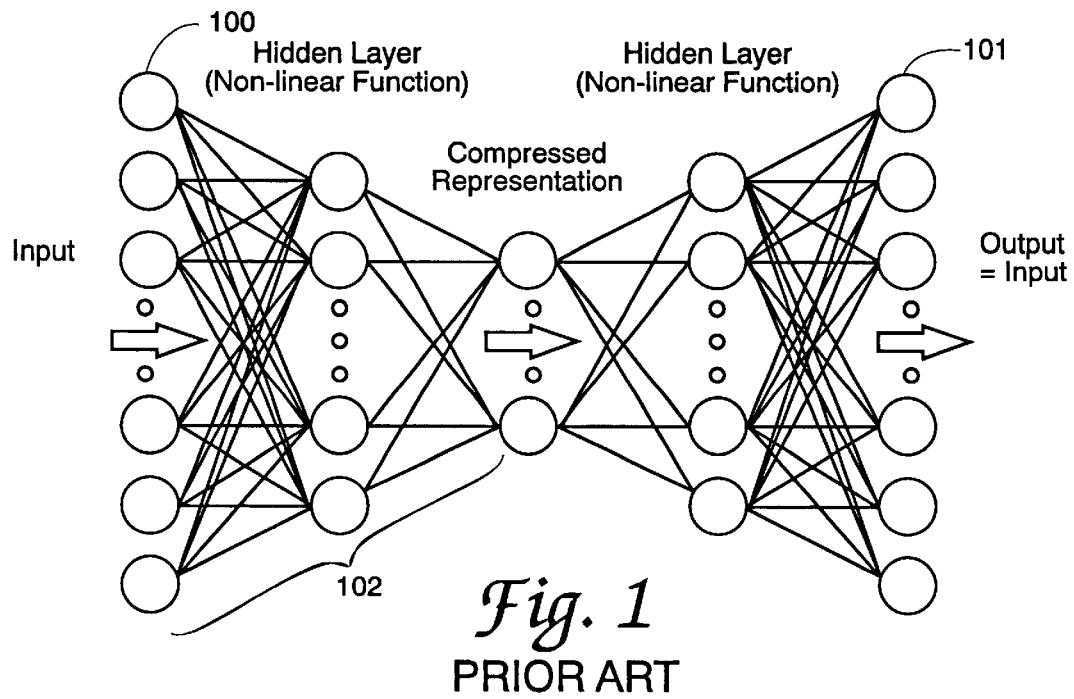
FIG. 1 shows a prior art autoassociative neural network.
Figure 2:
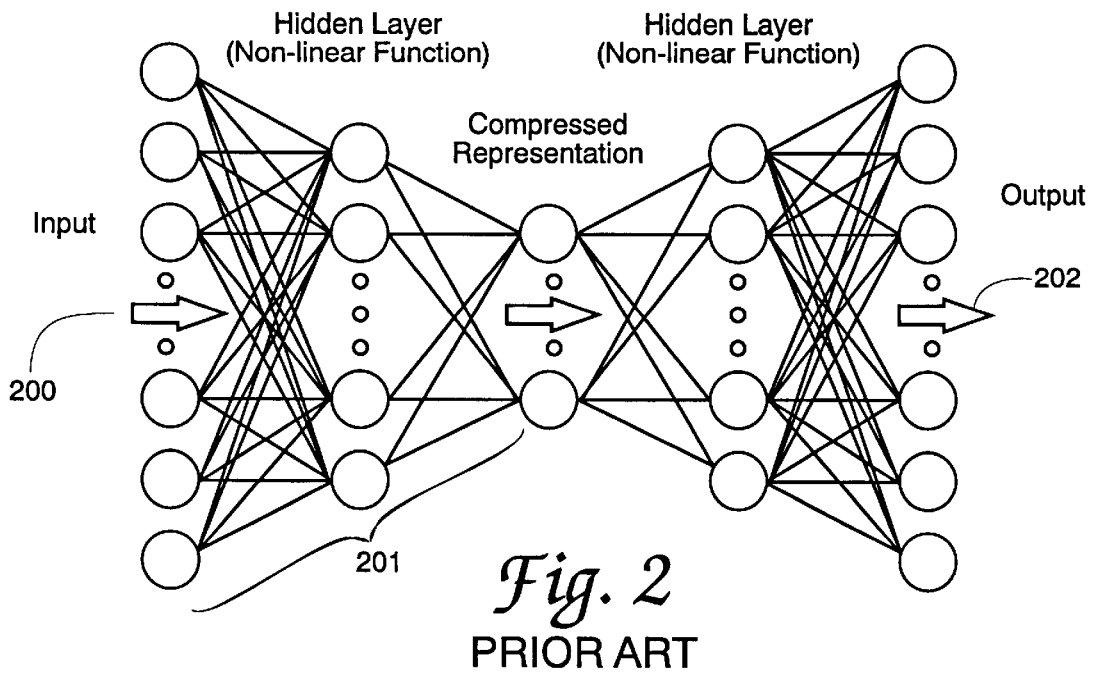
FIG. 2 shows a prior art heteroassociative neural network.
Figure 3:
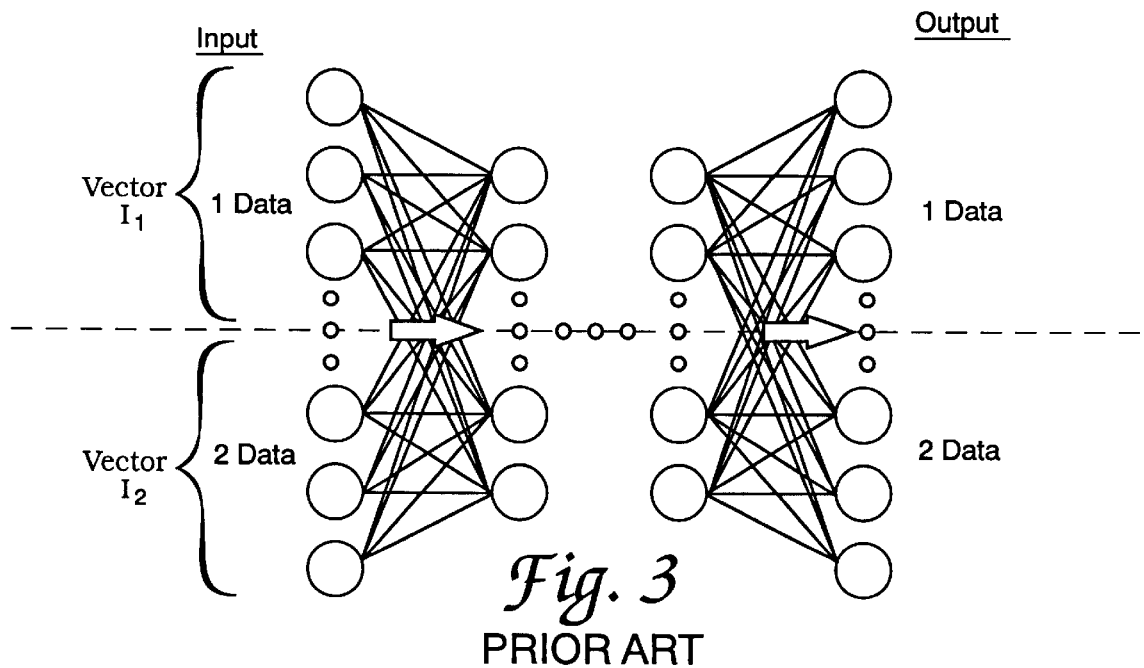
FIG. 3 shows a prior art joint data heteroassociative autoassociative neural network.

The A-HNN of the present invention significantly departs from the operations of the typical AANN of FIG. 1 or the joint HANN of FIG. 3 and may be considered in contrast thereto. Considering the invention in view of mathematical vector relationships, the joint HANN of FIG. 3 provides an implicit identity mapping of two vectors, on input to the same vectors on output, $P(I_1,I_2)=(I_1,I_2)$. That is, two sets of data are input and two sets of data are output. The two-vector output is created from the input vectors operated on by P, a composite function created from the encoding layer function, A, and decoding layer function, B, of the network: $P=B \cdot A$, as the mapping function. Concatenation of these two vectors, that is, placing the vectors in a series relationship so that the end of one vector is the beginning of the next, provides the ability to analyze them separately; the individual vectors operated upon by the network are defined by $P=(P_1,P_2)$ such that $P_1(I_1,I_2)=I_1$, and $P_2(I_1,I_2)=I_2$. Defining the decoding layer $B=(B_1, B_2)$ such that $B_1$(middle layer nodes)=$I_1$ and $B_2$(middle layer nodes)=$I_2$, the composite function of the network becomes $P=B \cdot A=(B_1 \cdot A, B_2 \cdot A)$ such that $P_1=B_1 \cdot A$ and $P_2=B_2 \cdot A$.

By contrast, the A-HNN architecture of the present invention provides the inverse of the encoding layer and the individual B decoding layers of this AANN, that is, $Q=(Q_1, Q_2)$ where $Q_1(I_1)=(I_1,I_2)$ for $Q_1=P_1^{-1}=A^{-1} \cdot B_1^{-1}$ and $Q_2(I_2)=$ $(I_1, I_2)$ for $Q_2 = P_2^{-1} = A^{-1} \cdot B_2^{-1}$, providing the inverse of A exists. Therefore, the A-HNN encoding layer, F, is equivalent to $B_1^{-1}$ or $B_2^{-1}$, and the decoding layer, G, is equivalent to $A^{-1}$, regardless of which image is processed on the input. $A^{-1}$ exists if and only if the network maps to the intrinsic dimensionality of the data which provides a 1 to 1 mapping. Higher dimensional mappings result in some redundancy, and will not be 1 to 1, but still permit the existence of $A^{-1}$. If the network maps to a dimension lower than the intrinsic dimension, then $A^{-1}$ will not exist.

Figure 4:
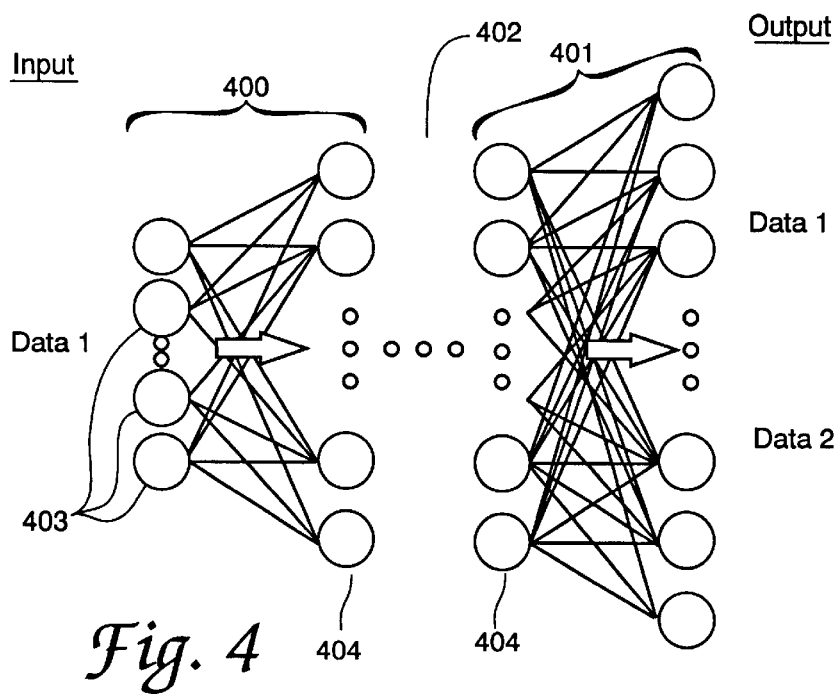
FIG. 4 shows a general architecture of an autoassociative-heteroassociative neural network according to the invention.
Figure 5:
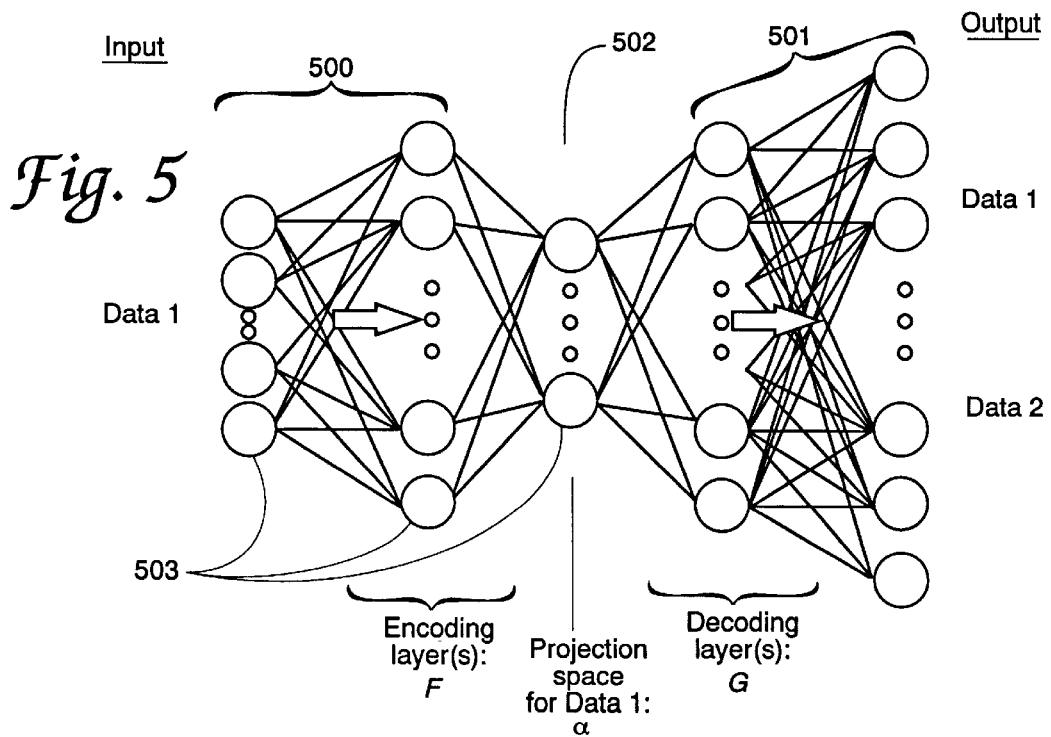
FIG. 5 shows a autoassociative-heteroassociative neural network architecture for a specific application according to the invention.

A software architecture of the A-HNN of the invention is shown in FIG. 4 and can be analyzed in two halves, with a projection space in-between. The first half, represented at 400 in FIG. 4, includes the input to the projection space of the network, and is referred to as the encoding portion of the network. The second half, represented at 401 in FIG. 4, includes the network from the projection space to the output, and is referred to as the decoding portion of the network. The large circles shown, for example, at 403 in FIG. 4 represent nodes and each column of nodes, two such columns shown at 404 in FIG. 4, represents a layer. For the A-HNN architecture of FIG. 4, the encoding portion of the network 400 is the information content in just one data set. This portion of the network is providing constraints on the projection space representations, to only represent one image in a different dimension or smaller space. The encoding subnetwork of the neural network creates a projection space by mathematically transforming the input data, possibly a linear transformation down to Eigen vectors. From this constrained space or projection space, the decoding portion of the network 401 provides a joint transformation to the original and a second data set. Because of the constraints applied by the input portion of the network 400, the output transformation is consistent with the original data and the second data set.

The A-HNN of FIG. 4 represents only one possible arrangement of the invention. The A-HNN configuration can include any number of intermediate layers and any number of nodes on each intermediate layer. The number of layers and the number of nodes per layer are based on the intrinsic dimensionality of the data. Typically, this is not known ahead of time, and the precise architecture, i.e. the number of layers and the number of nodes per layer, is determined by trial and error. Backpropagation, using the mean square error function, is the training algorithm applied to determine the correct weight values within the network. The training data is input to the network as a single set of data and output as two data sets.

Figure 8:
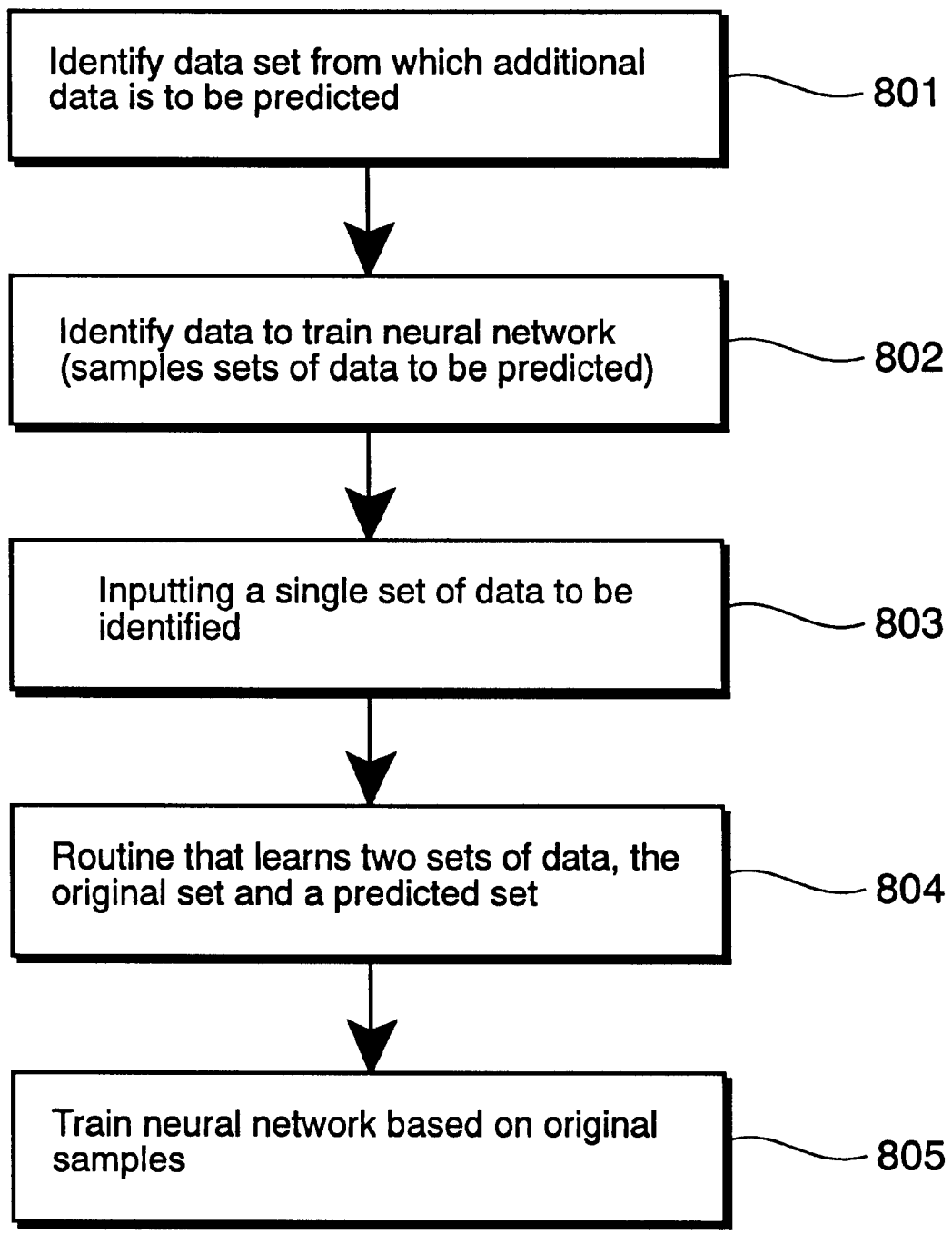
FIG. 8 describes a flow chart of a A-HNN software algorithm according to the invention.

The A-HNN of the invention is implemented by a software algorithm for processing data. A flow chart of such an algorithm of the invention is shown in FIG. 8. Block 801 represents the step of identifying the data set from which additional data is to be predicted. The second step represented at block 802 involves identifying data to train the neural network, or samples of data sets to be predicted. The third step of the algorithm is represented in block 803 and involves inputting a single set of data to be identified. The algorithm includes a routine where two sets of data are learned from one set of data and such routine is represented at block 804. That, is one set of data is input and a predicted set is output as well as a set identical to the one originally input. Finally, the algorithm trains the neural network, as represented at block 805 in FIG. 8, by repeatedly running samples through the algorithm. After training, the algorithm is available for processing new data samples.

An example of possible code for such an algorithm is shown in Appendix A. The code provided in Appendix A is written for the specific application of determining images from multiple resolution (MR) image data of human heads and faces, frequently used in medical testing. The algorithm operates by taking MR image data and extracting human feature data by applying a wavelet transformation. The wavelet transformation separates data that indicates "soft" facial tissue from data that indicates "bone" facial tissue in an approximation image, thereby creating the input data vector for an A-HNN. The algorithm then takes computer tomography (CT) image data and similarly extracts features by applying a wavelet transformation and separates the bone from the soft tissue in an approximation image to create the target data vectors for A-HNN. Finally, the algorithm creates an A-HNN with MR as input data vectors and MR+CT concatenated target output vectors.

The A-HNN of the present invention may also be considered as a mapping device, mapping the input to a projection space and another mapping to the output. The output of the A-HNN may be considered as a joint functional mapping between two data sets, constrained by one of the data sets. The software or neural network of the invention will provide an output predicting the second data set, based on the projection information that is present only in the first data set. The autoassociative output, the replicated data set of the input, is a means to verify the generalization robustness of the network. Having both an autoassociative relationship and a heteroassociative relationship in the network not only provides the interrelationships between the data sets, but also permits the ability to cross check the operation and quality of the network. The autoassociative output is a means to verify the operation and results of the network operation by comparing the input data with the autoassociative target data.

The fundamental concept of the A-HNN of the invention is to train the network to produce a desired output, while using inputs as target data. The addition of the input data to the target vector, not only provides a means of determining the generalization robustness of the network, but also improves the training performance of the network. This A-HNN of the invention is further validated using the following two sets of diverse data.

Example 1

XOR Classification Data

A 600-point set of class-labeled XOR data is generated for training a multi-layer perceptron and an A-HNN, 300 for training and 300 for testing. A single-hidden-layer network may be used to separate the two-class XOR data, therefore, the architecture for both types of multi-layer perceptrons will have two input nodes, a single hidden layer, and output. For classification problems, the criterion for best performance of the network is testing accuracy.

A conventional multi-layer perceptron is a possible arrangement employed in the A-HNN of the invention and after multiple program runs, the best performance architecture is chosen as a network with 10 nodes on the hidden layer and sigmoid activation functions. This architecture results in a network with 100% testing accuracy, as shown in the Table 1 confusion matrix, trained in 1000 epochs to an mean square error of 0.320767, and required 78.6 million flops. The column headings of the table refer to the multi-layer perceptron output values, with thresholds applied at the class label values of $0\pm0.25$ and $1\pm0.25$; the undecided column would contain any network output values more than 0.25 away from 0 or 1, i.e., 0.25<output value <0.75. The row headings are the test data labels. Simply, the confusion matrix shows whether the neural network got confused in predicting the target data.

TABLE 1

Multi-Layer Perceptron Confusion Matrix for XOR Data.

Network Output →

| Test Data Label ↓ | Class 0 | Class 1 | Undecided |
|---|---|---|---|
| Class 0 | 150 | 0 | 0 |
| Class 1 | 0 | 150 | 0 |

Next, multiple single-hidden-layer A-HNNs are generated. Different target output configurations as well as different number of nodes on the hidden layer were tested. An XOR data classifier includes two inputs and one output. The program runs consist of testing different combinations of the two-input values as target-output values. After multiple program runs, the best performance architecture is chosen as a network using the first input value as a target output value and five nodes on the hidden layer each with sigmoid activation functions. This results in a network with 100% testing accuracy, as shown in the Table 2 confusion matrix, trained in 1000 epochs to an MSE of 1.29785, and required 52.1 million flops. The same threshold values as described above were used.

TABLE 2

A-HNN Confusion Matrix for XOR Data.

Network Output →

| Test Data Label ↓ | Class 0 | Class 1 | Undecided |
|---|---|---|---|
| Class 0 | 150 | 0 | 0 |
| Class 1 | 0 | 150 | 0 |

The multi-layer perceptron and the A-HNN of the present invention both provide a network that produces 100% testing accuracy. However, the A-HNN generates a network with fewer number of nodes on the hidden layer, i.e., 5 nodes versus 10, and requiring less time to train than the generic multi-layer perceptron, i.e., 52.1M flops versus 78.6M, resulting in a substantial improvement in computer time and memory utilization. Training performance is substantially improved using the A-HNN concept of inputs as desired target values.

The XOR classification data set is an extremely simple classification problem. Using XOR classification data, training was improved using one input as desired target output. In addition to testing the A-HNN of the present invention on XOR classification data, material classification data maybe used with the A-HNN of the invention. The question of whether the additional target outputs must be duplicated features from the input, or simply additionally identified features (not input values at all) is illustrated using the materials classification data.

Example 1 revealed another advantage of the A-HNN of the invention is the speed of neural network training. Training the A-HNN of the invention took less time that required for conventional predictive neural networks. The autoassociative portion of the network leads the training in outputting the replicated input data set.

Example 2

Material Data Classification

The materials data used for this example is ternary system material property data generated over many years of research. Typically, this data is separated into forming and non-forming materials classifications. On-going materials research emphasizes the need to predict those three element compounds that will form new material from those that won't.

The initial step to this prediction is determining the features that effectively discriminate new material formers from new material non-formers. Some material properties are well documented in materials handbooks, primarily through experimental results, some of which are non-reproducible and non-verifiable. The A-HNN will be used for associating the experimental handbook data, i.e., chemical elemental properties, to a set of features representing the physical nature of the material, namely the atomic characteristics of each element. This example translates the experimentally determined features to physical property data that may provide more accuracy in classification of forming/non-forming materials.

Figure 6:
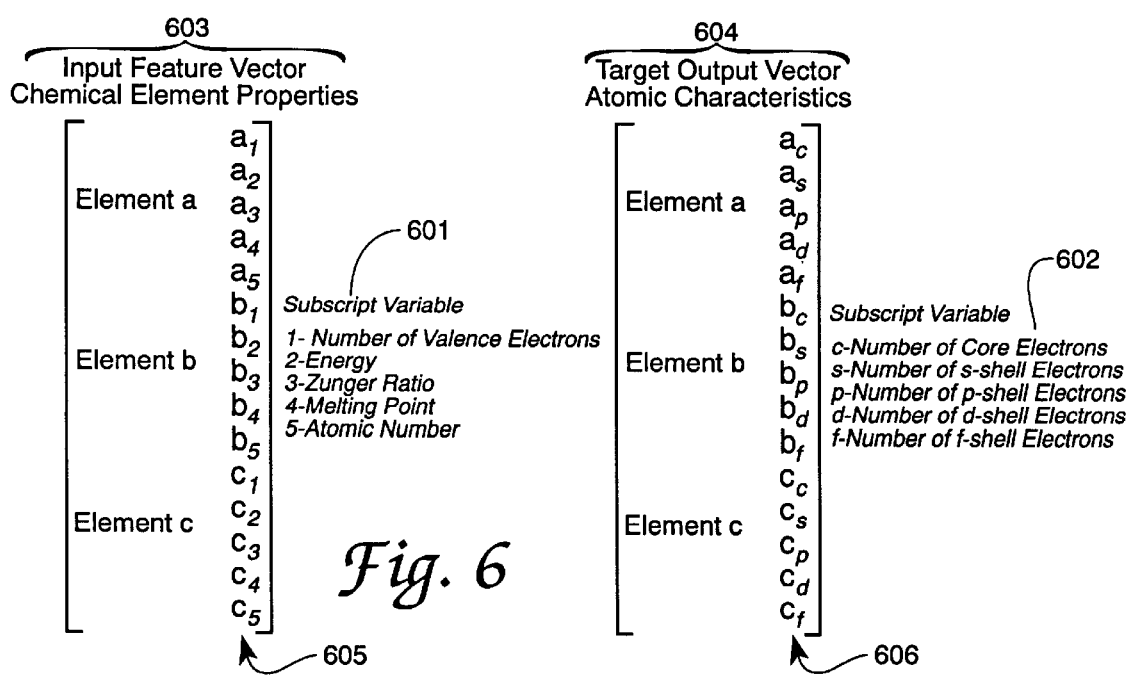
FIG. 6 shows a graphical depiction of input and output target prediction vectors for exemplary materials data according to the invention.

FIG. 6 shows a graphical depiction of inputs and outputs for materials data according to the invention. For the first set of features, each of the three elements of a ternary compound are identified by five variables, represented at 601 in FIG. 6, (chemical elemental properties): melting point, atomic number, number of valence electrons, electronegativity, and the Zunger radii. The second set of features is the atomic characteristics of each element, the number of electrons in the five shells, represented at 602 in FIG. 6. The atomic characteristics of each element are non-experimental, therefore, the ability to associate these two feature sets will permit the usage of a more stable feature set than the experimentally gathered properties for determining formers and non-formers of yet to be defined compounds.

The A-HNN architecture of the invention, capable of predicting as well as classifying data, is applied to this effort using the calculated chemical elemental properties represented at 603 in FIG. 6, as inputs and the atomic characteristics of each element as the prediction target values, represented at 604 in FIG. 6. The determination of the "autoassociative" target values requires multiple experiments, i.e., different program runs to define the optimum set of inputs to be used as target outputs. This research covers the evaluation of the A-HNN effectiveness under a variety of data conditions. A multi-layer perceptron is also programmed for a benchmark comparison.

The materials data set consists of a total of 4104 chemical elemental properties vectors, 15 features in length. 3500 of these vectors are used as training sample vectors. The prediction target values, the atomic characteristics of each element are determined for each of the 3500 three-element compounds. The prediction target values are also 15 features in length and consist of the number of electrons in the core, s-, p-, d-, and f-shells for each element. The input and prediction target vectors are graphically depicted in FIG. 6.

Four distinct networks were programmed for this example. The first network, a generic multi-layer perceptron, 15 feature inputs to 15 feature target values was implemented as a single-hidden-layer network with 15 nodes. This network trained the 15 feature-input vectors, shown at 605 in FIG. 6, to the 15 feature target vectors, shown at 606 in FIG. 6. The second implementation, an A-HNN with the 15 feature inputs, and the target vector with the full autoassociative 15 feature inputs as the top half, and the desired 15 feature target values as the bottom half, was programmed with a single hidden layer with 25 nodes.

Figure 7:
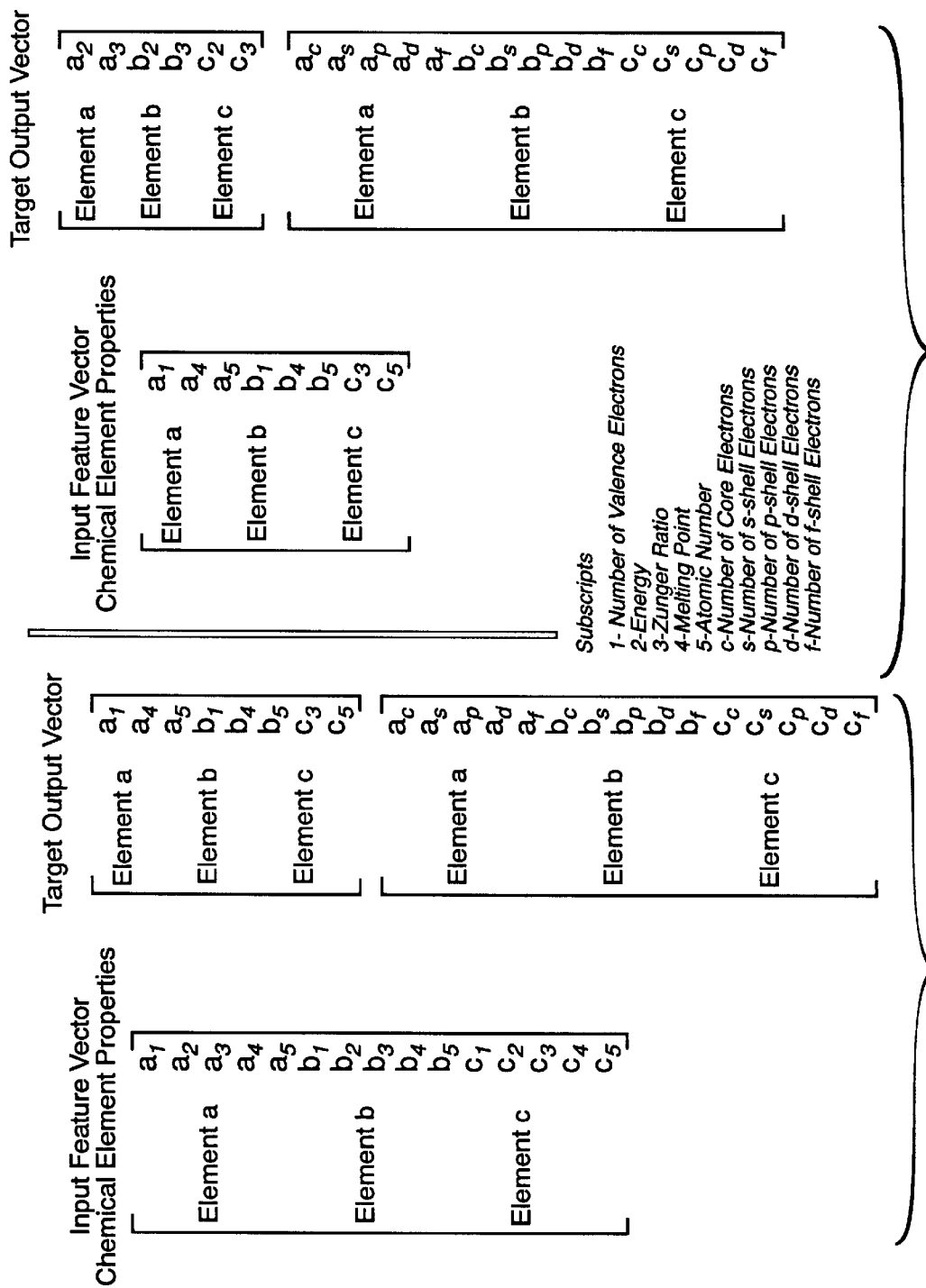
FIG. 7a shows a graphical depiction of an input vector for two implementations of the present invention.
FIG. 7b shows a graphical depiction of an output target vector for two implementations of the present invention.

The last two networks are A-HNNs programmed using variations of features on the input as well as for desired target values. One A-HNN variation uses all 15 features on the input, and a reduced subset of inputs as desired target values, through a single-hidden-layer network with 10 nodes. This FIG. 7a shows a graphical depiction of an input vector for two implementations of the present invention. The second variation uses a reduced subset of the 15 features as inputs, with the target values from the 'rejected' input features. FIG. 7b shows a graphical depiction of an output target vector for two implementations of the present invention.

These four networks were generated and run and the results are shown in Table 3. The best overall accuracy is obtained using the A-HNN with all 15-feature inputs also used as target output values. For these results the network configuration required 25 nodes on the single hidden layer— more than any other configuration, but it trained to a desirable testing accuracy in a fewer number of training epochs and only slightly more flops than a smaller configuration. The generic multi-layer perceptron provided the next best testing accuracy with a smaller network configuration and less number of flops. However, though the overall accuracy is over 92%, the individual feature testing accuracy is significantly lower than the individual feature testing accuracy in the full A-HNN configuration. The last two A-HNN configurations, with different features selected for the input and target output values, the results were significantly inferior, especially as regards the individual feature testing accuracy.

TABLE 3

Results of Network Implementations of Materials Data.

| Network Configuration | Epochs | Hidden Layer Nodes | Network Accuracy | Least Feature Accuracy | Number of Flops |
|---|---|---|---|---|---|
| A-HNN | 15,000 | 25 | 93.6% | 83.4% | 4.7955 E10 |
| Multi-Layer Perceptron | 35,000 | 15 | 92.2% | 68% | 4.3985 E10 |
| A-HNN: Subset of Inputs to Different Subset of Inputs as Targets | 30,000 | 20 | 88.8% | 73.8% | 5.3568 E10 |
| A-HNN: Full Set of Inputs to Subset of Inputs as Targets | 30,000 | 10 | 84.4% | 67.4% | 3.38619 E10 |

The two test runs used to validate the A-HNN of the invention, the XOR classification and a real-world materials property data analysis, demonstrates the A-HNN as an effective and efficient tool to process data. The A-HNN, while providing a robustness check on the network, improves the training performance over that of multi-layer perceptron implementations. The A-HNN is most effective when some or all of the input-vector values are duplicated as target-outputs. The duplicity of the data, as a constraint device on the encoding section, and a target on the decoding section, significantly improves the training performance and the overall efficiency of the network operation.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. A robustness quantifiable autoassociative-heteroassociative neural network capable of synthesizing two sets of output signal data from a single input signal data set for predicting numerical fluctuations including stock market fluctuations, said network comprising:
    an encoding subnetwork comprising:
        a plurality of input signal receiving layers and nodes communicating numerical fluctuation data input signals to a projection space of said neural network, said input signals being from a source external to said neural network,
        a plurality of encoding nodes within said neural network input signal receiving layers forming one representative input signal;
    a decoding subnetwork connected to said projection space comprising a plurality of output signal transmitting layers communicating output signal data from said projection space of said neural network to an output;
    a plurality of decoding nodes within said output signal transmitting layers jointly transforming said numerical fluctuation input signal data set to a first predicted data set such as future stock market performance and a second data set replicating said input signal data set;
    a mean square error backpropagation neural network training algorithm;
    a source of training data such as historic stock market performance connected to said encoding subnetwork and applied to said mean square error backpropagation neural network training algorithm as a single set on said encoding subnetwork and generating two data sets from said decoding network; and
    an input signal data set and said second data set from said decoding subnetwork comparator block, said comparator block comparing accuracy of replication of said second data set from said decoding subnetwork to said input signal data set indicating robustness of said neural network.

2. The robustness quantifiable neural network of claim 1 wherein said second data set replicating said input signal data set is an autoassociative output signal data set.

3. The robustness quantifiable neural network of claim 1 wherein said first output signal predicted data set replicating said input signal data set is a heteroassociative output signal data set.

4. The robustness quantifiable neural network of claim 1 wherein said plurality of input signal receiving layers, said plurality of encoding nodes, said plurality of output signal transmitting layers and said plurality of decoding nodes are input signal data set dimensionality dependent.

5. The robustness quantifiable neural network of claim 1 wherein said mean square error backpropagation neural network training algorithm includes a wavelet transformation for extracting distinguishing data from said training data.

6. The robustness quantifiable neural network of claim 1 wherein a second output data set exactly replicating said input signal data set indicates a neural network of high accuracy.

7. The robustness quantifiable neural network of claim 1 wherein said encoding subnetwork and decoding subnetwork is a multi-layer perceptron.

8. The robustness quantifiable neural network of claim 1 including a training time-efficient mean square error backpropagation neural network training algorithm.

9. A robustness quantifiable neural network method capable of synthesizing two sets of output signal data for process discovery including thin film growth and new materials design from a single input signal data set, said method comprising the steps of:

encoding input signal data into a representative reduced digital bit single input signal within an encoding subnetwork of said neural network, said encoding comprising the steps of:

communicating input signals to said neural network through a plurality of input signal receiving layers and nodes, forming one representative input signal using a plurality of encoding nodes within said neural network input signal receiving layers;

holding said representative reduced digital bit single input signal within a projection space;

decoding said representative reduced digital bit single input signal within a decoding subnetwork of said neural network, said decoding comprising the steps of:

communicating output signal data from said projection space of said neural network to an output through a plurality of output signal transmitting layers; jointly transforming said input signal data set to a first predicted data set and a second data set replicating said input signal data set through a plurality of decoding nodes within said output signal transmitting layers;

training said neural network using a mean square error backpropagation neural network training algorithm;

applying training data to said mean square error backpropagation neural network training algorithm as a single set to said encoding subnetwork and outputting as two data sets from said decoding network; and comparing said input signal data set and said second data set from said decoding subnetwork and determining accuracy of replication of said second data set from said decoding subnetwork to said input signal data set indicating robustness of said neural network.

10. The neural network computing method of claim 9 wherein said step of jointly transforming further includes the step of jointly transforming said input signal data set to a first predicted heteroassociative data set.

11. The neural network computing method of claim 9 wherein said step of jointly transforming further includes the step of jointly transforming said input signal data set to a second autoassociative data set replicating said input signal data set.

12. The neural network computing method of claim 9 wherein said training step further includes step of time-efficient training using a wavelet transformation for extracting data from said training data.

13. The neural network computing method of claim 9 wherein said encoding and decoding steps are input signal data set dimensionality dependent.

14. A robustness quantifiable neural network learning method comprising the steps of:

identifying multiple resolution image data of human features from which additional human feature data is predictable;

presenting samples of human feature data desired to be predicted to train said neural network;

inputting a single set of human feature data from said identifying step;

programming said neural network to predict said single set of data from said inputting step and to learn data to be predicted;

training said neural network to predict said single set of data from said inputting step and to learn data to be predicted; and outputting two predicted data sets, a first data set representing said single set of data from said inputting step and a second data set representing data desired to be predicted, a resemblance of said first data set to said single set of data from said inputting step indicating robustness of said second data set.

15. The robustness quantifiable neural network learning method of claim 14 wherein said first data set from said outputting step is an autoassociative output signal data set.

16. The robustness quantifiable neural network learning method of claim 14 wherein said second data set from said outputting step is a heteroassociative output signal data set.

17. The robustness quantifiable neural network learning method of claim 14 wherein said programming step further includes the step of programming using a mean square error backpropagation training algorithm.

18. The robustness quantifiable neural network learning method of claim 14 wherein said programming step further includes the step of programming using a wavelet transformation for extracting extinguishing data from said identifying step.

19. The robustness quantifiable neural network learning method of claim 14 wherein said training step is accomplished in a shorter timer period than conventional networks.

20. The robustness quantifiable neural network learning method of claim 19 wherein said providing step further includes providing a multilayer perceptron neural network containing an encoding subnetwork and a decoding subnetwork.

* * * * *